US007685210B2

(12) United States Patent  (10) Patent No.: US 7,685,210 B2
Plastina et al.  (45) Date of Patent: *Mar. 23, 2010

(54) MEDIA DISCOVERY AND CURATION OF PLAYLISTS

(75) Inventors: Daniel Plastina, Sammamish, WA (US); Michael J. Novak, Redmond, WA (US); William Frederick Kiefer, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

This patent is subject to a terminal disclaimer.

(21) Appl. No.: 11/323,343

(22) Filed: Dec. 30, 2005

(65) Prior Publication Data

US 2007/0168388 A1    Jul. 19, 2007

(51) Int. Cl.
*G06F 17/30* (2006.01)
(52) U.S. Cl. ........................................ 707/805; 707/803
(58) Field of Classification Search ............... 707/1, 707/10, 100–102, 104.1; 725/9, 44, 47, 58
See application file for complete search history.

(56) References Cited

U.S. PATENT DOCUMENTS

| | | | |
|---|---|---|---|
| 5,616,876 A | 4/1997 | Cluts | |
| 5,749,081 A | 5/1998 | Whiteis | |
| 6,006,234 A | 12/1999 | Govindarajan et al. | |
| 6,041,311 A | 3/2000 | Chislenko et al. | |
| 6,118,450 A | 9/2000 | Proehl et al. | |
| 6,418,421 B1 | 7/2002 | Hurtado et al. | |
| 6,438,579 B1 | 8/2002 | Hosken | |
| 6,449,627 B1 | 9/2002 | Baer et al. | |
| 6,526,411 B1 * | 2/2003 | Ward | 707/102 |
| 6,539,395 B1 | 3/2003 | Gjerdingen et al. | |
| 6,545,209 B1 | 4/2003 | Flannery et al. | |
| 6,549,922 B1 | 4/2003 | Srivastava et al. | |
| 6,560,607 B1 | 5/2003 | Lassesen | |
| 6,587,837 B1 | 7/2003 | Spagna et al. | |
| 6,605,770 B2 | 8/2003 | Yamane et al. | |
| 6,657,117 B2 | 12/2003 | Weare et al. | |
| 6,748,395 B1 | 6/2004 | Picker et al. | |
| 6,760,721 B1 | 7/2004 | Chasen et al. | |
| 6,947,922 B1 | 9/2005 | Glance | |
| 7,227,073 B2 | 6/2007 | Kim | |
| 7,246,112 B2 * | 7/2007 | Ishida et al. | 707/3 |
| 2002/0001395 A1 | 1/2002 | Davis et al. | |

(Continued)

FOREIGN PATENT DOCUMENTS

EP    1189437 A2    3/2002

(Continued)

OTHER PUBLICATIONS

MArtin Hellman, U.S. Appl. No. 60/698,786, filed Jul. 12, 2005, 67 pages.*

(Continued)

*Primary Examiner*—Cam-Linh Nguyen
(74) *Attorney, Agent, or Firm*—Senniger Powers LLP (57) ABSTRACT

A media player monitors user playback control actions, such as skip commands, during a playback experience associated with a playlist. Based on these actions, the media player sets one or more media files to an inactive state. The media player defines a subgroup, or modified playlist excluding the inactive media files for further processing.

20 Claims, 9 Drawing Sheets

U.S. PATENT DOCUMENTS

| | | |
|---|---|---|
| 2002/0033844 A1 | 3/2002 | Levy et al. |
| 2002/0040326 A1* | 4/2002 | Spratt ........................... 705/26 |
| 2002/0055951 A1 | 5/2002 | Shigetomi et al. |
| 2002/0059370 A1 | 5/2002 | Shuster |
| 2002/0069218 A1 | 6/2002 | Sull et al. |
| 2002/0087565 A1 | 7/2002 | Hoekman et al. |
| 2002/0099737 A1 | 7/2002 | Porter et al. |
| 2002/0103796 A1 | 8/2002 | Hartley |
| 2002/0103920 A1 | 8/2002 | Berkun et al. |
| 2002/0138619 A1 | 9/2002 | Ramaley et al. |
| 2002/0143976 A1 | 10/2002 | Barker et al. |
| 2002/0157095 A1 | 10/2002 | Masumitsu et al. |
| 2002/0184180 A1 | 12/2002 | Debique et al. |
| 2002/0196976 A1 | 12/2002 | Mihcak et al. |
| 2003/0028796 A1 | 2/2003 | Roberts et al. |
| 2003/0036948 A1 | 2/2003 | Woodward et al. |
| 2003/0045953 A1 | 3/2003 | Weare |
| 2003/0045954 A1 | 3/2003 | Weare et al. |
| 2003/0105743 A1 | 6/2003 | Ireton |
| 2003/0182184 A1* | 9/2003 | Strasnick et al. .............. 705/14 |
| 2003/0182254 A1 | 9/2003 | Plastina et al. |
| 2003/0182255 A1 | 9/2003 | Plastina et al. |
| 2003/0182315 A1 | 9/2003 | Plastina et al. |
| 2003/0221541 A1 | 12/2003 | Platt |
| 2003/0225777 A1 | 12/2003 | Marsh |
| 2003/0236582 A1 | 12/2003 | Zamir et al. |
| 2004/0006575 A1 | 1/2004 | Visharam et al. |
| 2004/0017997 A1 | 1/2004 | Cowgill |
| 2004/0060426 A1 | 4/2004 | Weare et al. |
| 2004/0064500 A1 | 4/2004 | Kolar et al. |
| 2004/0123725 A1 | 7/2004 | Kim |
| 2004/0172593 A1 | 9/2004 | Wong et al. |
| 2004/0210533 A1 | 10/2004 | Picker et al. |
| 2004/0267693 A1 | 12/2004 | Lowe et al. |
| 2005/0021500 A1 | 1/2005 | Plastina et al. |
| 2005/0081159 A1 | 4/2005 | Gupta et al. |
| 2005/0098023 A1 | 5/2005 | Toivonen et al. |
| 2005/0234958 A1 | 10/2005 | Sipusic et al. |
| 2005/0262151 A1 | 11/2005 | Plastina et al. |
| 2006/0088292 A1* | 4/2006 | Guillen et al. ................ 386/96 |
| 2006/0212478 A1 | 9/2006 | Plastina et al. |
| 2006/0242661 A1* | 10/2006 | Bodlaender et al. ............ 725/9 |
| 2007/0014536 A1* | 1/2007 | Hellman ...................... 386/94 |
| 2007/0025194 A1* | 2/2007 | Morse et al. ................ 369/30.1 |
| 2007/0088727 A1 | 4/2007 | Kindig |

FOREIGN PATENT DOCUMENTS

| | | |
|---|---|---|
| WO | WO 01/28222 A2 | 4/2001 |
| WO | WO 03/023781 A1 | 3/2003 |

OTHER PUBLICATIONS

Edward Swierk, et al., The Roma Personal Metadata Service, Mobile Networks and Applications vol. 7, pp. 407-418, 2002.

Viksnins and Kim, "Musicmatch Jukebox 10.0: CNET editor's review," Jul. 27, 2004, 4 pages, http://reviews.cnet.com/Musicmatch_Jukebox_10_0/4514-8033_7-30567399.html?tag=btm.

Buskirk, Rizzo and Viksnins, "Apple iTunes 4.5: CNET editor's review," Jul. 16, 2004, 3 pages, http://reviews.cnet.com/null/4514-9240_7-30974726.html?tag=btm.

Unknown, "Rhapsody 3.0: CNET editor's review," Apr. 27, 2005, 7 pages, http://reviews.cnet.com/Rhapsody_3_0/4514-3513_7-20050753.html?tag=btm.

Wilkins, "Yahoo Music Unlimited: CNET editor's review," Aug. 8, 2005, 6 pages, http://reviews.cnet.com/Yahoo_Music_Unlimited/4514-9240_7-31383691.html?tag=btm .

Viksnins and Wilkins, "Napster 3.0: CNET editor's review," Mar. 3, 2005, 5 pages, http://reviews.cnet.com/ Napster_3_0/4514-3669_7-31302303.html?tag=btm.

Minibayeva et al., "A Digital Library Data Model for Music," Proceedings of the Second ACM/IEEE-CS Joint Conference on Digital Libraries, 2002, pp. 154-155, ACM Press, New York, U.S.A.

Chen et al., "Metadata for Mixed-Media Access," 1994, Sigmod Record, vol. 23, No. 4, pp. 64-70.

MusicMatch, MusicMatch Jukebox Use's Guide, Feb. 7, 2003, Chapters A1-A6 and 1-9.

* cited by examiner

MEDIA DISCOVERY AND CURATION OF PLAYLISTS

BACKGROUND

Due to recent advances in technology, computer users are now able to enjoy many features that provide an improved user experience. For example, users can play media and multimedia content on various computing devices, such as personal, laptop, or handheld computers, as well as mobile phones and other portable media devices. In some media environments, a computing device has access to a computer-readable medium storing media files such as Moving Picture Experts Group audio layer-3 (MP3) files and Windows® Media technologies audio (WMA) and video (WMV) files. Many computers are also able to play compact discs (CDs) and digital versatile discs (DVDs) and have an internet connection capable of streaming and downloading audio and video.

In the realm of personal digital media, there may be several interesting "scopes" of media. For example, at one end of the spectrum, a user may store a personal media collection locally on one or more machines or devices. A typical user's local or personal media collection includes perhaps a few hundred to a few thousand media items. At the other end of the spectrum, online retailers (e.g., FYE.com), online media sources (e.g., Microsoft Corporation's MSN® Music service), and online subscription services (e.g., Napster® and RealNetwork's Rhapsody® digital music services) often have libraries of more than a million media items available to the user remotely (e.g., via the internet). A general interaction model between these two scopes is to extract media from one and insert the items into the other by purchasing and/or downloading media content. Another general interaction model is to enjoy media from the larger scope (e.g., an online media service) without the user having to explicitly download media items locally.

A media player application typically organizes several media items (e.g., video files, music files, photos, etc.) into one or more playlists when compressed media files are rendered on a computing device. Unfortunately, a user often expends considerable time and energy to individually select and add items to the playlist. In addition to the effort required, the user may also have difficulty identifying each of the media items for inclusion in the playlist. For example, remembering the name of each particular media item (or artist, genre, creator, creation date, style, likes or dislikes, mood, sentimental value, etc.) to include in a playlist is often difficult. This inability to recall each desirable media item can lead to a user-created playlist that includes only a few common media items familiar to the user. Such a playlist may be shorter than it need be, mundane, repetitive, and generally not pleasing, even to the user who created it.

The issue of recalling media items of interest is exacerbated with the era of online media libraries, such as for music and other audio, movies and other video, among others. For example, a single user can subscribe to a media service (e.g., a subscription service) having over a million available media items. Such a subscription simply provides too many choices for a single user to review and consider for a playlist.

Because media discovery can be very tedious and time-consuming, many users wish to take a more passive or "bulk" approach to the experience by using randomly generated or pre-composed playlists. Online music services, for example, make such playlists available to users. In the music example, the user can retrieve lists of content, not just individual songs (e.g., "Hot new songs", "U2's favorite songs"; "Music to skate board by Tony Hawk", and so forth). But a particular user's personal preferences are not likely to match exactly with those used to generate the playlist. Thus, randomly generated or pre-composed playlists will usually include at least one item that does not appeal to the user. During the playback experience, the user may skip over one or more of these items in the playlist. Unfortunately, conventional media players do not retain this information for future purposes (e.g., subsequent playback, etc.).

SUMMARY

Embodiments of the invention overcome one or more deficiencies in known media player systems by providing improved media discovery and curation of playlists and the like. Advantageously, a media player embodying aspects of the invention monitors user playback control actions, such as skip commands, during a playback experience associated with a playlist. For example, a user's actions in connection with a randomly generated playlist, a pre-composed playlist made available to the user via an online service, or the like, may be interpreted as representative of user preferences. Based on these actions, the media player sets one or more media items in the playlist to an inactive state. The inactive status may be visually indicated by, for example, graying out or dimming the skipped items. The media player defines a subgroup, or modified playlist, excluding the inactive media files for further processing. For example, the user may elect to save only the media items that were not skipped, repeat the playlist excluding the skipped songs, generate a new playlist, and so forth.

Computer-readable media having computer-executable instructions for processing media files embody further aspects of the invention. Alternatively, embodiments of the invention may comprise various other methods and apparatuses.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
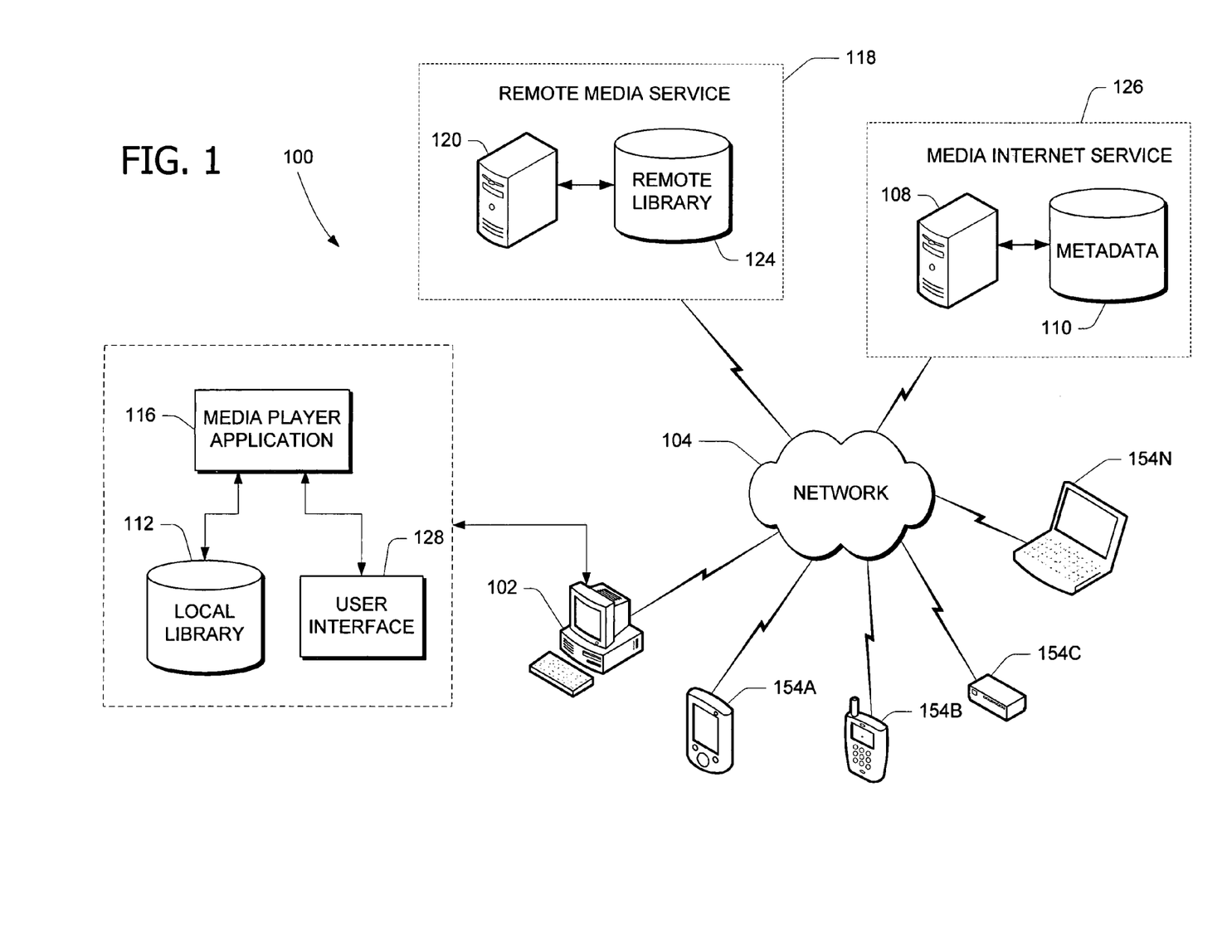
FIG. 1 is a block diagram illustrating components of an exemplary computer system implementing an embodiment of the invention.

Referring now to the drawings, FIG. 1 illustrates an exemplary computing environment in which embodiments of the present invention may be implemented for enhancing user media playing experience. As described in detail below, aspects of the invention permit recording and graphically representing a user's actions in connection with media content in a playlist. Moreover, aspects of the invention may be applied to various forms of digital media, including audio files (e.g., music tracks, news reports, audio web logs, audio books, speeches, comedy routines, etc.), video and multimedia files (e.g., movies, movie trailers, television shows, etc.), and images. Aspects of the invention may also be applied to physical libraries of traditional, non-digital media items such as books, physical DVD collections, and the like.

In FIG. 1, a media player system 100 includes one or more client computing devices such as computer 102 coupled to a data communication network 104. One or more server computers 108 may also be coupled to the network 104. As shown, the system 100 also includes one or more databases 110 associated with server 108. In one embodiment, the computer 102 accesses the server 108 (and the information in the database 110) via network 104. As an example, network 104 is the internet (or the World Wide Web) but aspects of the present invention may be applied to any data communication network. Server 108 and computer 102 communicate in the illustrated embodiment using, for example, the hypertext transfer protocol (HTTP).

Referring further to FIG. 1, the user's computer 102 can access one or more digital media files stored in the form of a local media library 112. The local media library 112 may reside on the computer's hard drive, a removable computer-readable storage medium, or the like. In the illustrated embodiment, computer 102 executes a media player application 116 for rendering selected media files. Those skilled in the art are familiar with such software routines that, when executed by a computer, render media content and retrieve, store, and display contextual information. The media player application 116 may be any suitable media player that is configured to play digital media so that a user can experience the content that is embodied on the media. For example, a media player application embodying aspects of the invention may be built on Microsoft Corporation's Windows Media™ Player program.

Aspects of the invention also include communication between the media player application 116 executed on computer 102 with one or more remote media services 118. The remote media service 118 may be, for example, an online retailer (e.g., FYE.com), an online media source (e.g., Microsoft Corporation's MSN® Music service), or an online subscription service (e.g., Napster® and RealNetwork's Rhapsody® digital music services). In one embodiment, remote media service 118 utilizes one or more servers 120 for maintaining a catalog of available media files, that is, a remote library 124. Those skilled in the art are familiar with such services from which a user may download music files and/or listen to songs directly via the internet, usually for a monthly subscription price or on a per-song basis. For example, the remote library 124 contains the inventory of an online media provider.

The system 100 of FIG. 1 permits the user to render a media file on an enabled media playing device (e.g., computer 102 running Microsoft® Windows® operating system and Windows Media™ Player program) and expect not only to experience the media content but also have access to all manner of related metadata. According to aspects of the invention, media player application 116 organizes several media items (e.g., video files, music files, photos, etc.) into a playlist of compressed media files to be rendered on computer 102. Because media discovery can be very tedious and time-consuming, many users wish to take a more passive or "bulk" approach to the experience by using a randomly generated list, a pre-composed specialty list, or the like. The remote media service 118, for example, makes such playlists available to users. In the music example, the user can retrieve lists of content, not just individual songs (e.g., "Hot new songs", "U2's favorite songs"; "Music to skate board by Tony Hawk", and so forth).

In one embodiment, the media player application 116 is also configured to communicate with server 108 and its associated database 110 via network 104 to access data stored in database 110. In this instance, server 108 and database 110 constitute a media internet services site 126 that enables the user to access, retrieve, and display so-called metadata. In particular, this aspect of the invention enables media player application 116 to access, retrieve, and display metadata in conjunction with rendering media content. Those skilled in the art are familiar with metadata, which is simply information about data. In the context of one or more embodiments of the present invention, metadata includes information related to specific content of a digital media file being rendered by the media player application 116. Basic metadata includes title, composer, performer, genre, description of content, and the like. Extended metadata includes cover art, performer biographies, reviews, related performers, where to buy similar items, upcoming concerts, ticket sales, URLs to other related experiences including purchase opportunities, and the like. In addition to factual and subjective bibliographical metadata, media internet service site 126 may aggregate metadata to provide, for example, metadata related to the user community (e.g., community-generated star ratings and current song or album rankings based on sales, frequency of playback, and the like).

Referring further to FIG. 1, server 108 matches the metadata stored in database 110 to the specific media content that is being experienced by the user. Server 108 then returns the metadata to the user's computer 102. In many of the examples herein, media content is described in the context of music content stored in the client computer's memory for convenience. It is to be appreciated and understood that the media content may be embodied on any suitable media, including digital files downloaded to the local memory of client computer 102 or accessible by computer 102 via network 104. The media content may include, without limitation, specially encoded media content in the form of, for example, an encoded media file such as media content encoded in Microsoft® Windows Media™ format using the Microsoft® Windows Media™ Player program.

A user interface 128 (e.g., as shown in FIGS. 2-8) associated with media player application 116 communicates information to the user and receives instructions and feedback from the user. In one embodiment, media player application 116 is responsive to user input via the user interface 128 for performing one or more media player operations. In addition to playback or transport controls, typical media player operations include, for example: displaying metadata associated with the media files; rendering, copying, or downloading selected media files; rendering samples of selected media files; assigning media files to one or more playlists; searching or sorting the media files according to their metadata or content; displaying media library contents; scrolling through the media library contents; and displaying contextual menus of available media player operations. The user community can also contribute key information, such as community ratings, via media player application 116 to improve the experience for other users. Other user interfaces different from those described above are contemplated as within the scope of the claimed invention.

The media player system 100 implements improved curation of playlists in accordance with aspects of the invention. As described above, computer 102 executes media player application 116 for rendering one or more media files. In this instance, local library 112, which may be stored on the hard drive of computer 102 or a removable storage device associated with the computer, contains one or more media files. In addition, remote library 124 contains one or more media files. Although library 124 is remote from computer 102, its media files are accessible by media player application 116 via network 104. The system 100 operates on an ordered group or list, or playlist, of one or more media items selected from a collection or multiple collections (e.g., library 112 and/or library 124) of media items and ordered for consumption by the user. Although referred to as a playlist, it is to be understood that the ordered list may include media files that are rendered not only by playing but also by other means (e.g., viewing, accessing, etc.).

A common playlist represents the tracks of an album. In this example, the "album" playlist defines an ordered set of N tracks that form a music CD. Another common playlist is an artist's discography, either sorted by release date or album track or by popularity. The remote media service 118 may provide such a playlist from its online media library. Those skilled in the art will appreciate from these examples that numerous playlists may exist, many of which are implicitly or machine generated with very little difficulty. As such, the likelihood is great that a user's personal preferences will not correspond perfectly with the media items in a particular playlist and the user will express as much during the playback experience.

Figure 2:
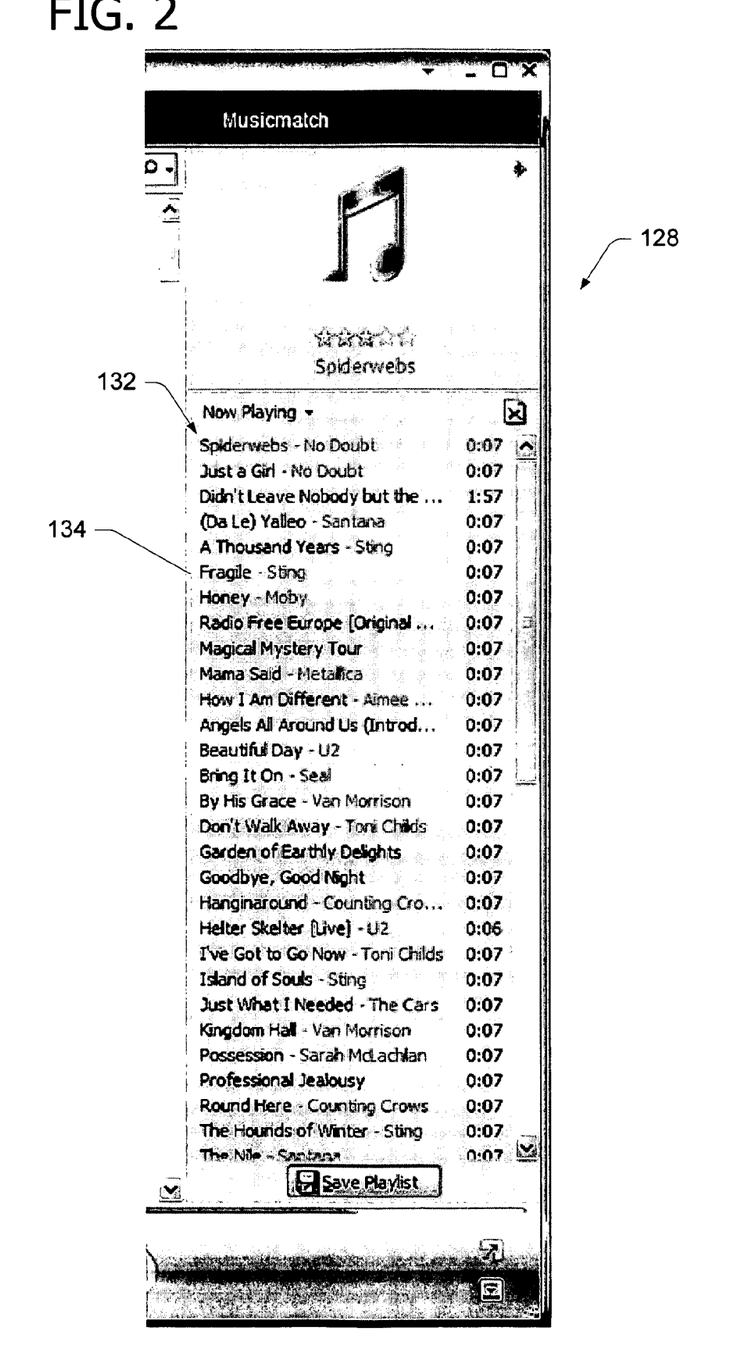
FIGS. 2-8 are portions of exemplary screen shots illustrating aspects of the invention.

Referring now to FIG. 2, media player application 116 organizes several media items (e.g., video files, music files, photos, etc.) into a playlist 132 when compressed media files are to be rendered on computing device 102. As described above, the remote media service 118, for example, makes such playlists available to users. In the music example, the user can retrieve lists of content, not just individual songs (e.g., "Hot new songs", "U2's favorite songs"; "Music to skate board by Tony Hawk", and so forth).

The user interface 128 supports various formats for viewing the media items included in the playlist 132. As shown in FIG. 2, user interface 128 presents playlist 132 in a basket pane 134 or other region or window elsewhere in the media player user interface. The media files in the group are in an active state for rendering to the user according to the playback experience. As directed by the user, media player application 116 may render the playlist in order or shuffle the media items for playing in a random order. In the example of FIG. 2, user interface 128 also provides a "Now Playing" view to indicate the particular media file being currently accessed, or played, by the user. In this example, the track listing for "Spiderwebs" is highlighted in a color such as green to indicate that it is the currently playing item.

Moreover, user interface 128 can provide properties relating to the media items of playlist 132 to the user, including the number of media items in a respective library or playlist, the duration of each individual media item, and other properties of the media items in libraries and playlists. For simplicity, FIG. 2 shows each track in playlist 132 as having an exemplary duration of seven seconds but the actual duration may be different. In addition to the data provided to the user by user interface 128, the user may also influence the actions of media player application 116 and exercise some control over the system by providing some behavioral feedback regarding preferences.

Generally, user interface 128 provides basic playlist manipulation commands, or user playback controls, such as the ability to manually add or delete one or more media items from a library or playlist. In particular, the user can interact with the playlist view of basket pane 134 to add or delete media items and to modify the properties (e.g., metadata) of the media items. The user playback controls provide the user with transport controls (e.g., play, stop, pause, forward, back, seek forward, seek back, mute, etc.), as well as the ability to skip one or more media items, shuffle the items, and rate the currently playing item. As would be readily understood by one skilled in the art, other input channels are contemplated as within the scope of the present invention.

Because a particular user's personal preferences are not likely to match exactly with those used to generate a given playlist, the playlist 132 may include one or more media items that do not appeal to the user. During the playback experience, the user's actions in connection with playlist 132 may be interpreted as representing his or her preferences. For example, when the user executes a user playback control to skip over one or more of these items in playlist 132, it indicates that the user did not like the media items and does not wish to play them again. Likewise, when the user rates a media item poorly (e.g., one star), media player application 116 may interpret the user's action as indicating that the user does not wish to play the item again. Aspects of the invention permit recording and graphically representing these user actions in connection with media content playlist 132.

Figure 3:
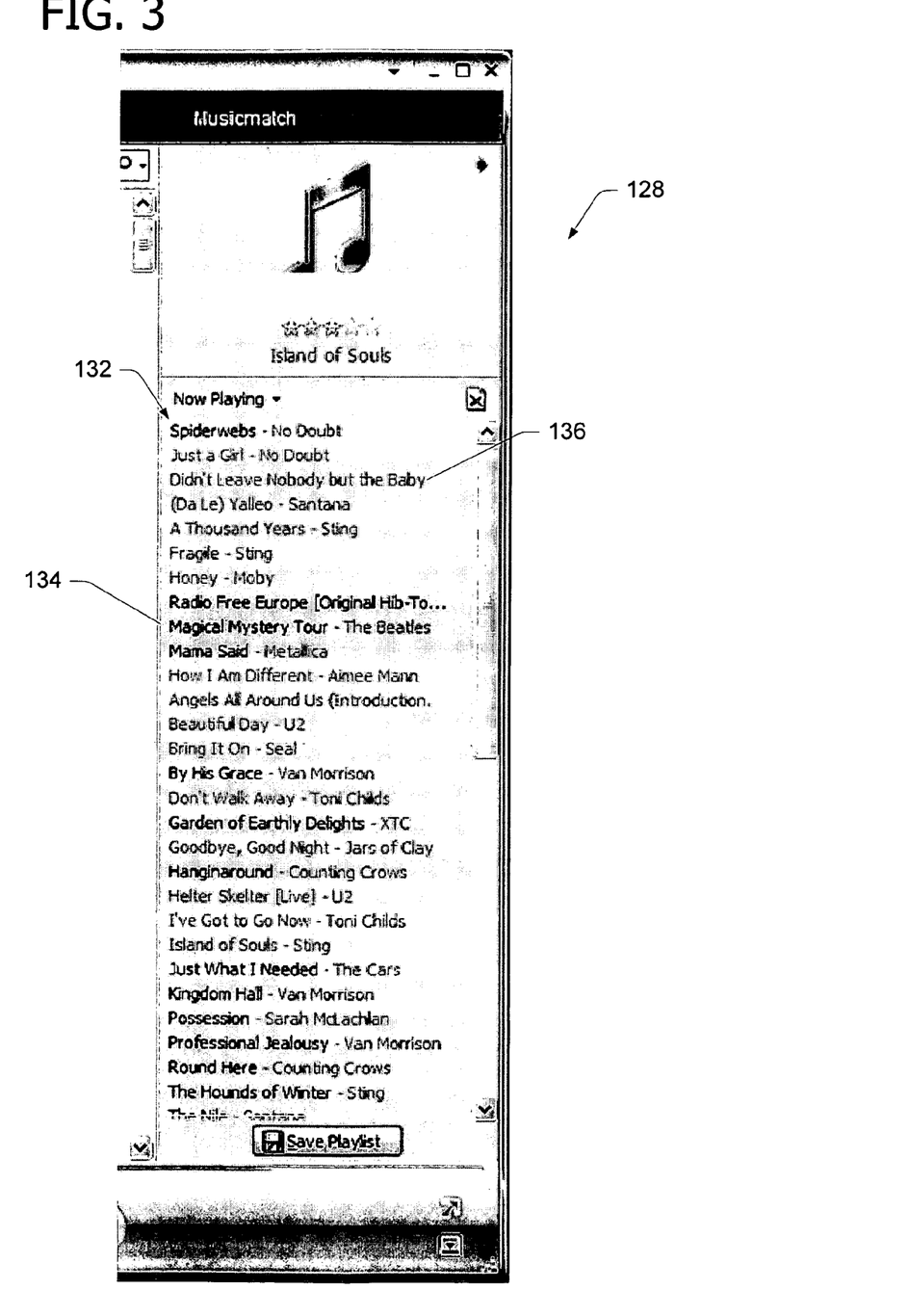

In FIG. 3, media player application 116 monitors a user playback control action (e.g., a skip command) during a playback experience associated with playlist 132. In this embodiment, based on the user playback control action, media player application 116 sets at least one of the media files to an inactive state. For example, skipped items are grayed out (e.g., inactive track listing 136) or otherwise switched to an inactive status and user interface 128 visually indicates this status to the user in the basket pane 134. The presence of an inactive item in playlist 132 is used to make subsequent options available to the user. Consequently, a subgroup of the media files, including active media files (shown in black) and excluding inactive media files (shown in gray), is defined. In the example of FIG. 3, the track listing for "Island of Souls" is highlighted in a color such as green to indicate that it is the currently playing item; 14 track listings are shown in gray text as inactive; and seven track listings preceding "Island of Souls" remain active and are shown in black text.

The user interface 128 visually distinguishes the inactive media files in playlist 132 by, for example: dimming playlist entries corresponding to the inactive media files; graying out playlist entries corresponding to the inactive media files; displaying playlist entries for the inactive media files in a different font than playlist entries for the active media files; underlining playlist entries corresponding to the inactive media files; displaying playlist entries for the inactive media files in a different color than playlist entries for the active media files; displaying a symbol or icon near playlist entries corresponding to the inactive files; and removing playlist entries corresponding to the inactive media files from the playlist.

Figure 4:
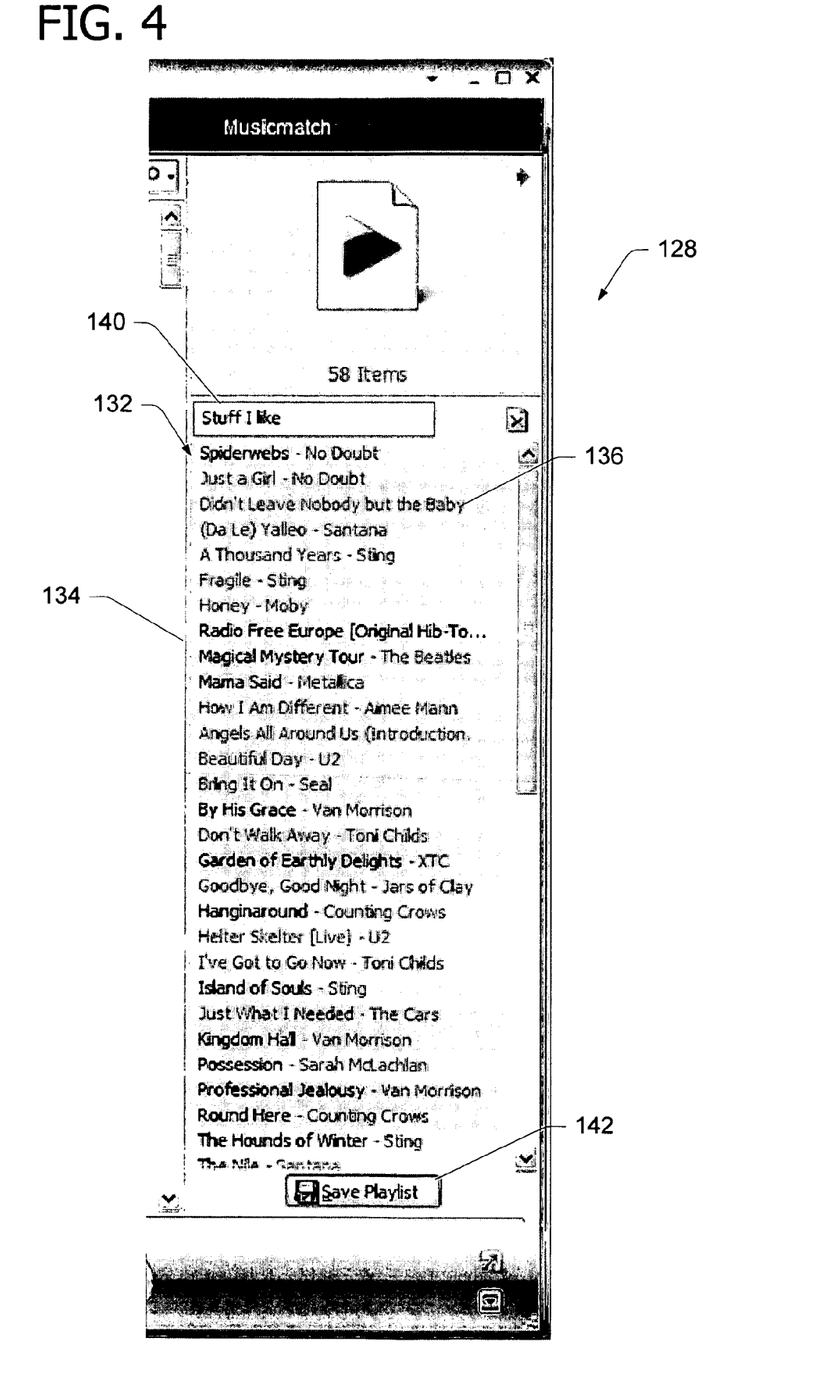

Referring now to FIG. 4, user interface 128 provides the option of saving the subgroup of media files (i.e., the remaining active files in playlist 132). For example, the user may elect to save only the media items that the user did not skip, to repeat the modified playlist excluding the skipped items, or to generate a new playlist more closely reflecting the user's preferences. Advantageously, media player application 116 retains the "skip information" and leaves the inactive media files in the inactive state during a subsequent playback experience associated with the group of media files. In other words, this aspect of the invention permits the user to render the modified playlist in a repeat mode in which the skipped songs are automatically skipped again during the next playback experience. Effectively, the user can listen to (and continually modify) playlist 132 several times until he or she no longer skips anything within the list. On the other hand, if the user decides to play a previously skipped item, the user can simply click on the inactive item (e.g., grayed out listing 136) to reset the media item to its active state and "play" is invoked again (but the media file need not be fully played). If all of the media items in playlist 132 are inactive, then playback stops.

A text field 140 in FIG. 4 accepts a user-provided name for the modified playlist to be saved. The user may also indicate a desire to save playlist 132 (as originally presented or as modified), by clicking a save button 142.

Figure 5:
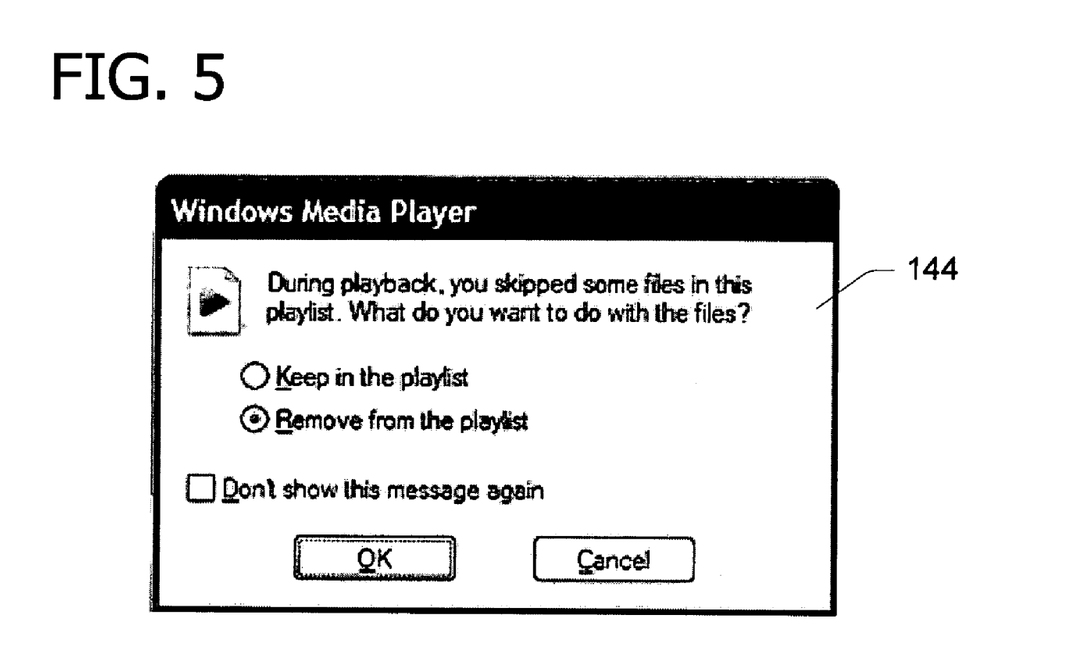

As shown in FIG. 5, user interface 128 presents a dialog box 144 providing save options to the user. In the exemplary dialog box 144, the user can select the option of saving all items in playlist 132 or saving a new playlist that ignores the inactive items (i.e., the tracks skipped during playback). Moreover, an embodiment of the invention provides an option for setting media player application 116 to a default save behavior.

Figure 6:
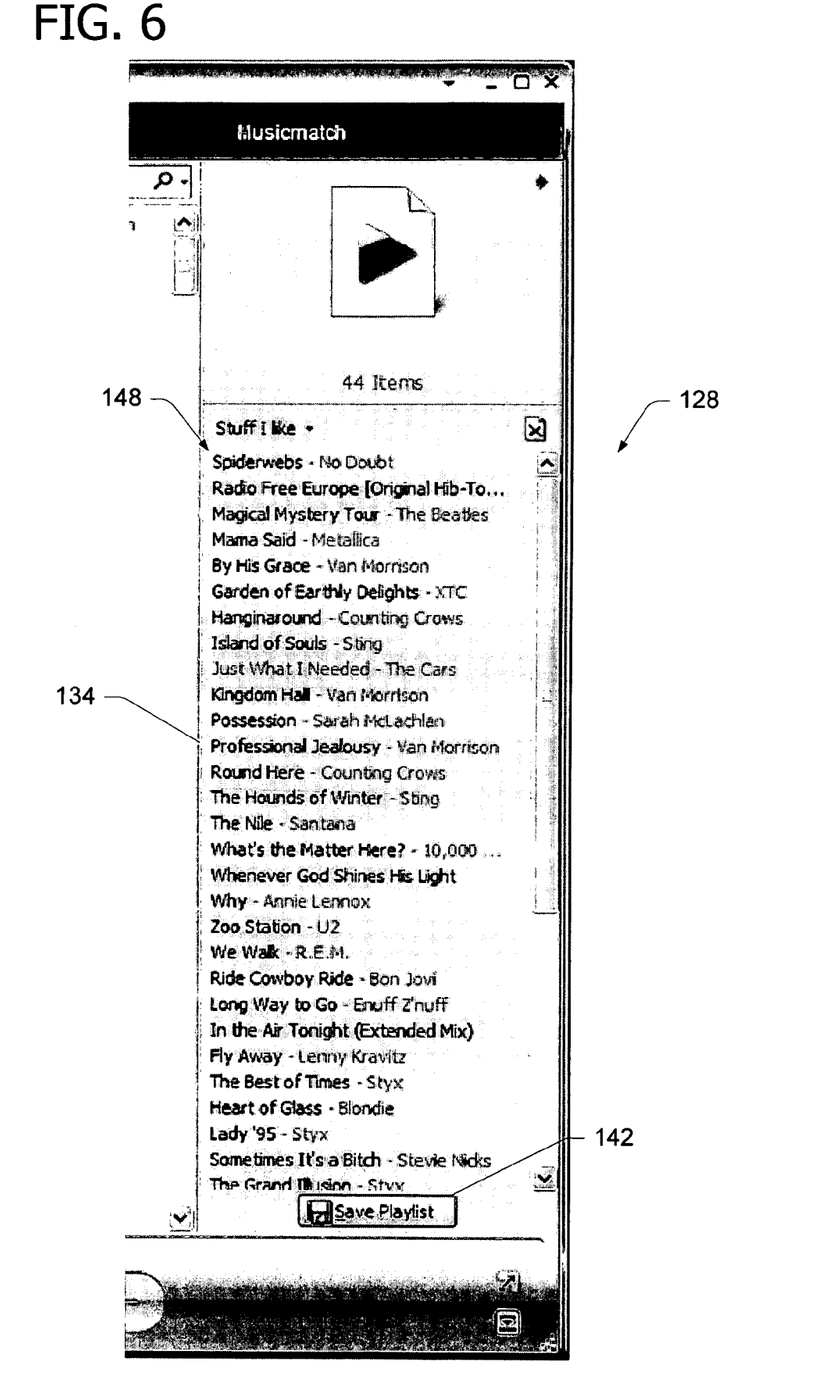

FIG. 6 illustrates the exemplary user interface 128 in which basket pane 134 displays a modified playlist 148 representing the saved subgroup of media files (i.e., the remaining active files in playlist 132). In this example, the new playlist 148 is entitled "Stuff I like" and the song "Just What I Needed" is currently playing.

Figure 7:
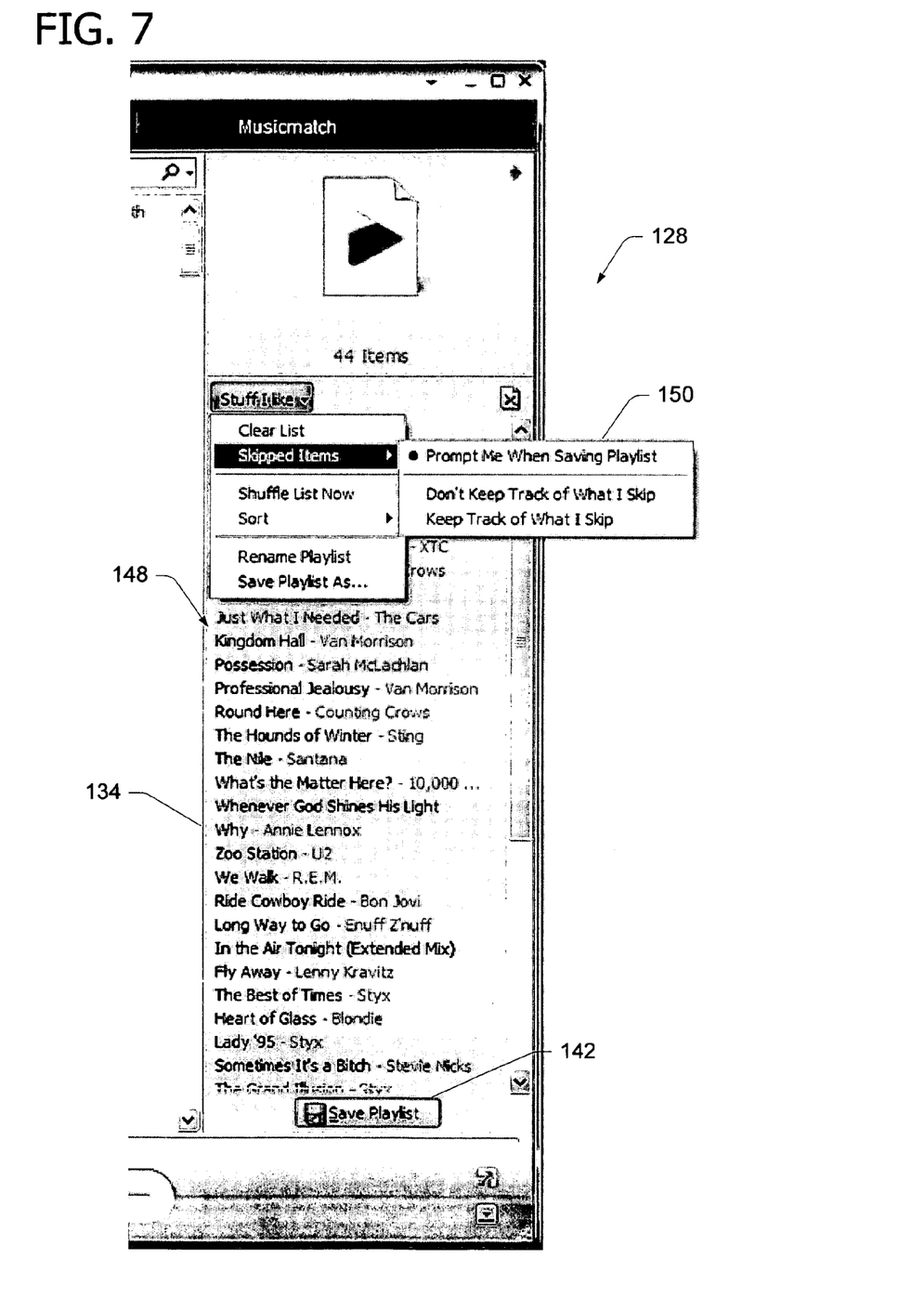

Referring now to FIG. 7, aspects of the invention provide a flyout menu 150 for presenting additional playlist management options to the user via user interface 128. For example, when the user right clicks on a skipped item, the flyout menu 150 displays playlist options, such as prompting the user when saving the playlist (default; graying behavior active but ask user); ignoring the skipped tracks (graying behavior active and used for setting grayed tracks to inactive); and keeping the skipped tracks (skipped items no longer grayed out). A radio button, for example, may be used to indicate the selected option. The exemplary playlist options of FIG. 7 also include an option for sorting playlist 132 "by skipped" to allow the user to group all of the inactive items and rate collectively rate them (e.g., select all skipped items and rate them all one star).

Figure 8:
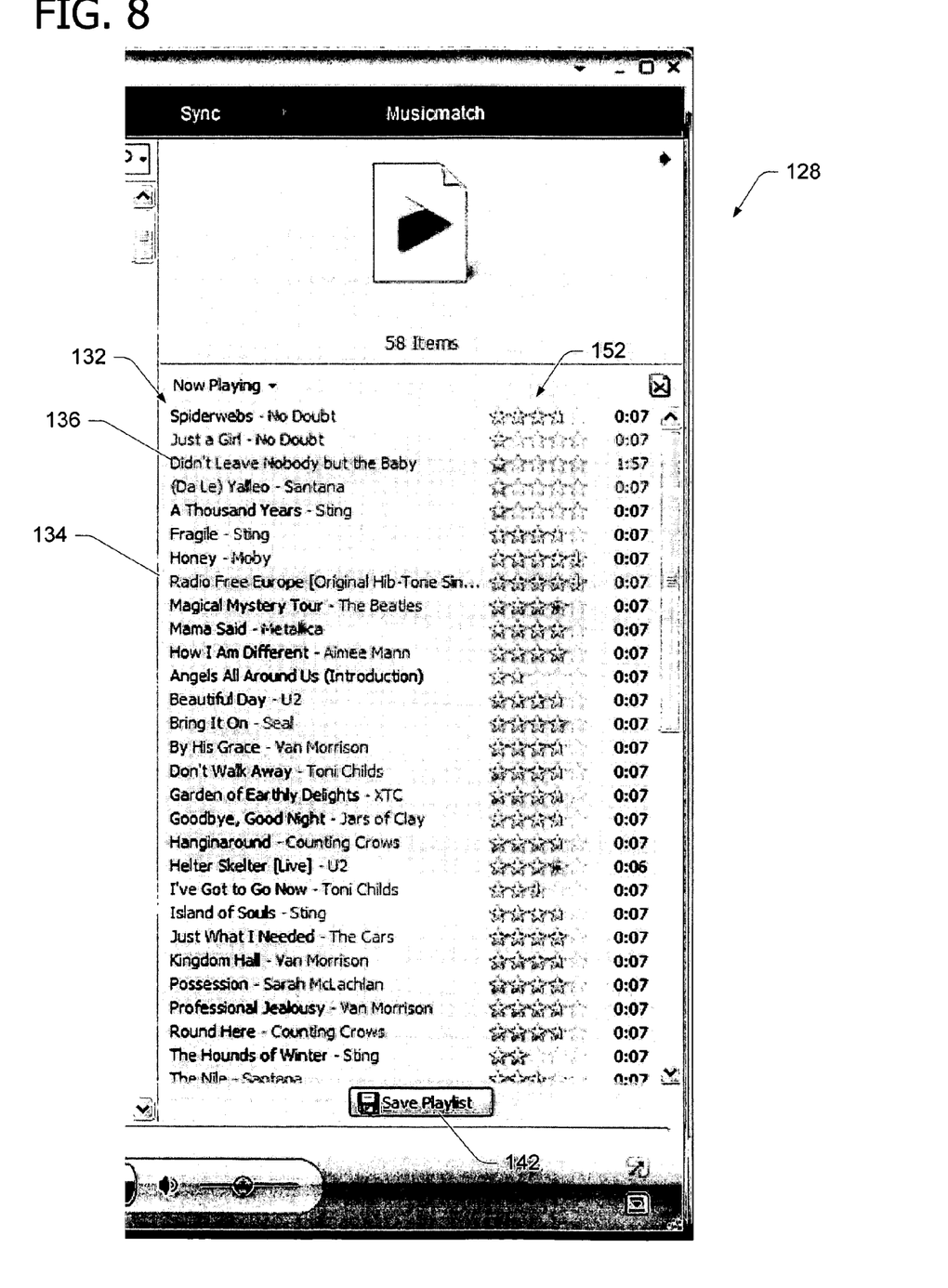

In FIG. 8, basket pane 134 is expanded to illustrate low user ratings associated with the inactive items in playlist 132. Graphical symbols, such as stars, may be used to visually represent a set of associated ratings, generally indicated at 152. As an example, media player application 116 automatically assigns a default rating (e.g., one star) to each of the inactive media files and is configured to display the ratings 152 in user interface 128. Moreover, media player application 116 may be further configured to provide feedback concerning playlist 132 to the media service 118 in response to the monitored user playback control action.

Referring again to FIG. 1, in an alternative embodiment of the present invention, a remote computing device 154 executes media player application 116, or reduced version of media player application 116, for rendering the media files in the playlist 132. The remote computing device 154 may a portable device such as a PDA 154A, mobile phone 154B, network music player or gaming system 154C, laptop computer 154N, or the like. Such devices may include a dedicated key for user input of the skip command. When the user synchronizes remote computing device 128 to local computing device 102, any information representative of monitored user playback control actions (e.g., skipped tracks in a playlist) are applied to the local computing device 102 for defining the subgroup of the media files. Although illustrated as communicating via network 104, it is to be appreciated that a number of wired and wireless network formats are available enabling communication between local computer 102 and remote computer 154.

Figure 9:
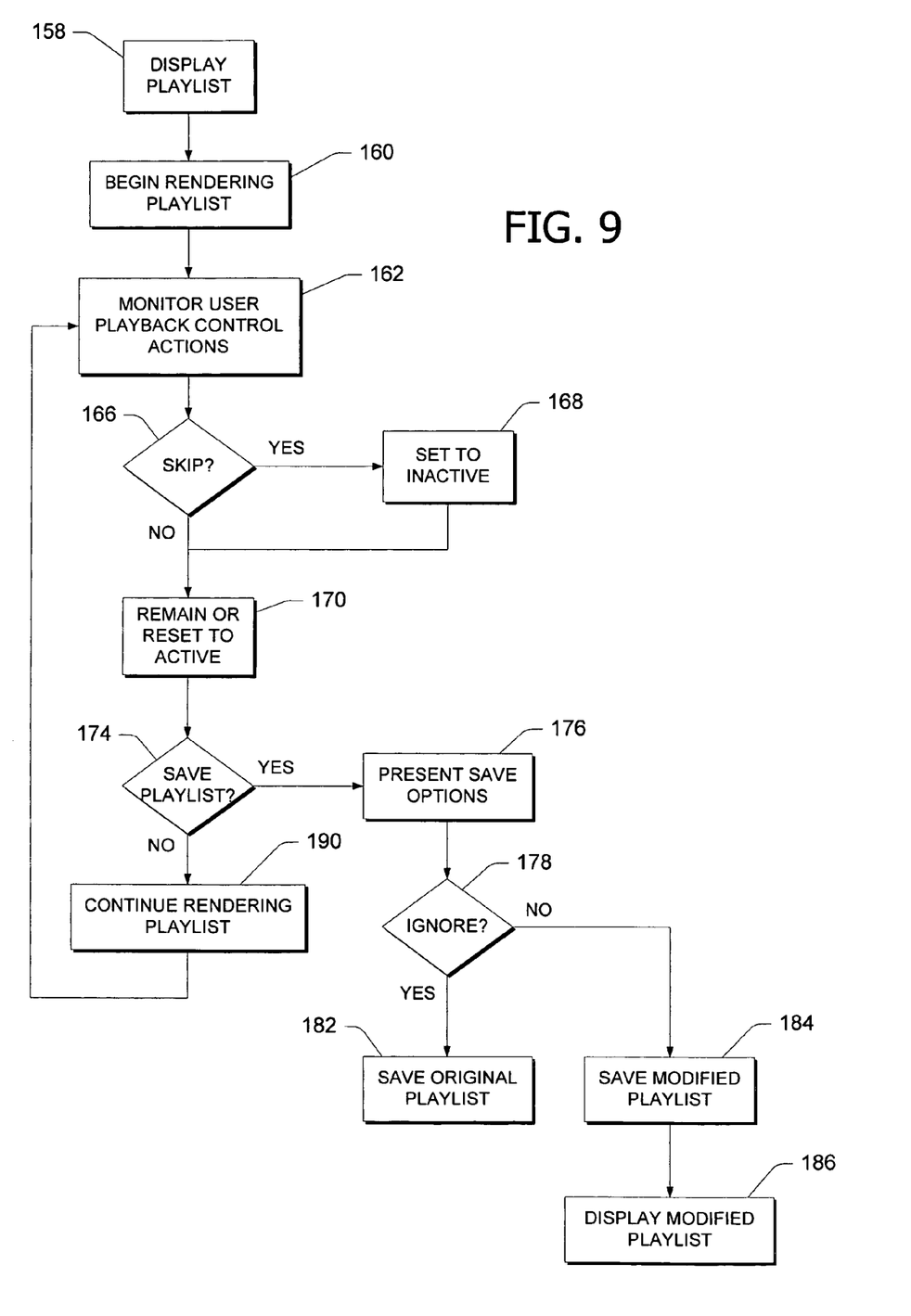
FIG. 9 is a flow diagram illustrating exemplary operations for modifying a playlist according to an embodiment of the invention.

Referring now to FIG. 9, in operation, media player application 116 monitors a user playback control action (e.g., a skip command) during a playback experience associated with a group of media files (e.g., a media library or a playlist). At 158, user interface 128 displays playlist 132. The media files in the group (e.g., playlist 132) are in an active state for rendering to a user according to the playback experience at 160. Based on the user playback control action at 162, at least one of the media files may be set to an inactive state. For example, if a skip command is received at 166, the skipped item is set to an inactive state at 168. If not, operations proceed to 170 where the item either remains active or is reset to active if it was previously skipped and now selected. Consequently, a subgroup of the media files, including active media files and excluding inactive media files, is defined (e.g., playlist 148).

In FIG. 9, when the user indicates a desire to save the subgroup at 174, the user interface 128 associated with media player application 116 provides one or more save options at 176 to receive user input for storing the defined subgroup (e.g., playlist 148). At 178, the user selects between saving all of the media files in the group and ignoring the inactive media files. According to aspects of the invention, the original playlist 132 may be stored at 182 or the defined subgroup of media files may be stored at 184 in response to user input and displayed at 186. Otherwise, media player application 116 continues rendering playlist 132 at 190.

The exemplary operating environment illustrated in FIG. 1 includes a general purpose computing device (e.g., computing device 102) such as a computer executing computer-executable instructions. The computing device typically has at least some form of computer readable media. Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through input devices or user interface selection devices such as a keyboard and a pointing device (e.g., a mouse, trackball, pen, or touch pad). Other input devices (not shown) may be connected to the computing device. A monitor or other type of display device (not shown) is also connected to the computing device. In addition to the monitor, computers often include other peripheral output devices (not shown) such as a printer and speakers, which may be connected through an output peripheral interface (not shown).

The computer 102 may operate in a networked environment using logical connections to one or more remote computers. The remote computer may be a personal computer, a server (e.g., servers 108, 124), a router, a network PC, a peer device or other common network node, and typically includes many or all of the elements described above relative to computer 102. Such networking environments are commonplace in offices, enterprise-wide computer networks, intranets, and global computer networks (e.g., the internet).

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A computer-implemented method of processing media files, said method comprising:

monitoring a user playback control action during a present playback experience associated with a playlist, said playlist being displayed for a user during the present playback experience, said playlist including a group of media files, said media files each being in an active state for rendering to a user according to the present playback experience, wherein said monitoring includes receiving a command from the user to skip one or more selected media files of said group of media files during the present playback experience;

setting the each of the selected media files from the active state to an inactive state in response to receiving the skip command during the present playback experience, wherein the media files included in the playlist that are in the active state are played for the user during the present playback experience and the media files included in the playlist that are in the inactive state are skipped during the present playback experience;

retaining the inactive media files in the playlist being displayed to the user during the present playback experience so that the inactive state of each of said inactive media files is available for resetting to the active state during the present playback experience; and modifying the playlist for rendering to the user according to a subsequent playback experience, said modified playlist including a subgroup of the media files, said subgroup including active media files, and said modified playlist excluding the inactive media files.

2. The method of claim 1 further comprising storing the modified playlist in response to user input.

3. The method of claim 1 further comprising executing a media player application, said media player application being configured for rendering the media files to generate the present playback experience, and further comprising presenting a user interface associated with the media player application.

4. The method of claim 3 further comprising displaying, in the user interface, a visual indication of the inactive media files in the playlist in response to the monitored user playback control action.

5. The method of claim 4 wherein the visual indication distinguishes the inactive and active media files in the group of media files by one or more of the following: dimming playlist entries corresponding to the inactive media files; graying out playlist entries corresponding to the inactive media files; displaying playlist entries for the inactive media files in a different font than playlist entries for the active media files; underlining playlist entries corresponding to the inactive media files; displaying playlist entries for the inactive media files in a different color than playlist entries for the active media files; displaying an icon near playlist entries corresponding to the inactive files; and removing playlist entries corresponding to the inactive media files from the playlist.

6. The method of claim 4 further comprising receiving the playlist from a media service.

7. The method of claim 6 further comprising providing feedback concerning the playlist to the media service in response to the monitored user playback control action.

8. The method of claim 1 further comprising assigning a default rating to each of the inactive media files.

9. The method of claim 1 further comprising executing a media player application on a remote computing device, said media player application being configured for rendering the media files to generate the present playback experience, and farther comprising synchronizing the remote computing device to a local computing device for providing information representative of the monitored user playback control action to the local computing device, said local computing device modifying the playlist in response thereto.

10. A computer-readable storage medium having computer-executable instructions stored thereon that, when executed, perform the method recited in claim 1.

11. In a computer system having a display, said display having a user interface rendered thereon, said user interface being associated with a media player application, said user interface comprising:
   a pane displaying a playlist of one or more media files initially set to an active state;
   a first user playback control responsive to user input for selecting one or more of the active media files from the playlist to be skipped during a present playback experience, each of said skipped media files being set from the active state to an inactive state upon being skipped, wherein the media player application is configured to play for a user during the present playback experience the media files being in the active state and to skip during the present playback experience the media files being in the inactive state;
   a visual indication in the playlist distinguishing the inactive media files from the active media files;
   a second user playback control responsive to user input during the present playback experience for resetting the inactive state of an inactive media file in the playlist to an active state; and
   an options dialog box for presenting one or more save options for storing a modified playlist to be rendered by the media player application during a subsequent playback experience and for receiving user input corresponding thereto, said modified playlist including the active media files and excluding the inactive media files.

12. The user interface of claim 11 wherein the visual indication comprises one or more of the following: dimming playlist entries corresponding to the inactive media files; graying out playlist entries corresponding to the inactive media files; displaying playlist entries for the inactive media files in a different font than playlist entries for the active media files; underlining playlist entries corresponding to the inactive media files; displaying playlist entries for the inactive media files in a different color than playlist entries for the active media files; displaying an icon near playlist entries corresponding to the inactive files; and removing playlist entries corresponding to the inactive media files from the displayed playlist.

13. A computer-implemented method of processing media files, said method comprising:
   monitoring a user playback control action during a present playback experience associated with a playlist, said playlist including a group of media files, said media files each being in an active state;
   setting one or more of the media files from the active state to an inactive state based on the monitored user playback control action, wherein only the media files included in the playlist that are in the active state are played for the user during the present playback experience; and
   retaining the inactive media files in the playlist, said inactive media files being in the inactive state during a subsequent playback experience associated with said playlist, wherein the inactive state of each of said inactive media files is available for resetting to the active state responsive to user input during said subsequent playback experience.

14. The method of claim 13 further comprising:
   executing a media player application, said media player application being configured for rendering the media files to generate the present playback experience, wherein said media files are rendered via a user interface; and
   displaying, in the user interface, the playlist and providing a visual indication in the playlist of the inactive media files.

15. The method of claim 13 wherein providing a visual indication comprises visually distinguishing the inactive and active media files in the group of media files by one or more of the following: dimming playlist entries corresponding to the inactive media files; graying out playlist entries corresponding to the inactive media files; displaying playlist entries for the inactive media files in a different font than playlist entries for the active media files; underlining playlist entries corresponding to the inactive media files; displaying playlist entries for the inactive media files in a different color than playlist entries for the active media files; displaying an icon near playlist entries corresponding to the inactive files; and removing playlist entries corresponding to the inactive media files from the playlist.

16. The method of claim 15 wherein the user interface provides a menu of available playlist options associated with the inactive media files, said playlist options including one or more of the following: always ask before ignoring the inactive media files; and always ignore the inactive media files.

17. The method of claim 13 further comprising:
   monitoring a user playback control action during the subsequent playback experience associated with the playlist;
   resetting one or more of the inactive media files to the active state based on the monitored user playback control; and
   modifying the playlist so that the reset files are in the active state, wherein only the media files included in the playlist that are in the active state are played for the user during the subsequent playback experience.

18. The method of claim 13 wherein monitoring the user playback control action comprises receiving a skip command from the user during the playback experience.

19. The method of claim 13 further comprising receiving the playlist from a media service.

20. A computer-readable storage medium having computer-executable instructions stored thereon that, when executed, perform the method recited in claim 13.

* * * * *